A. MIYAMOTO.
TAILOR'S MEASURE.
APPLICATION FILED MAY 18, 1915.
1,201,217.
Patented Oct. 10, 1916.
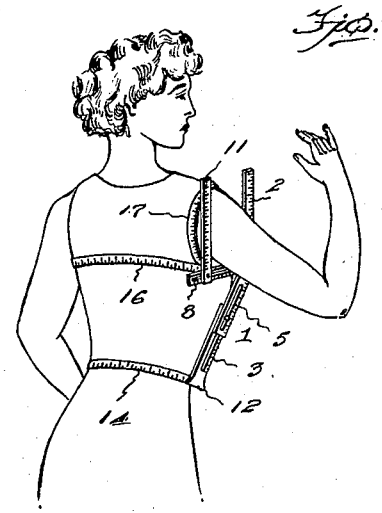
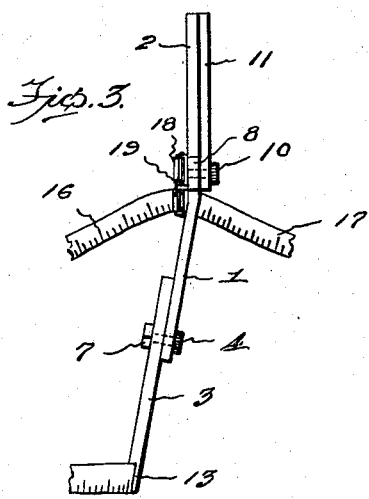
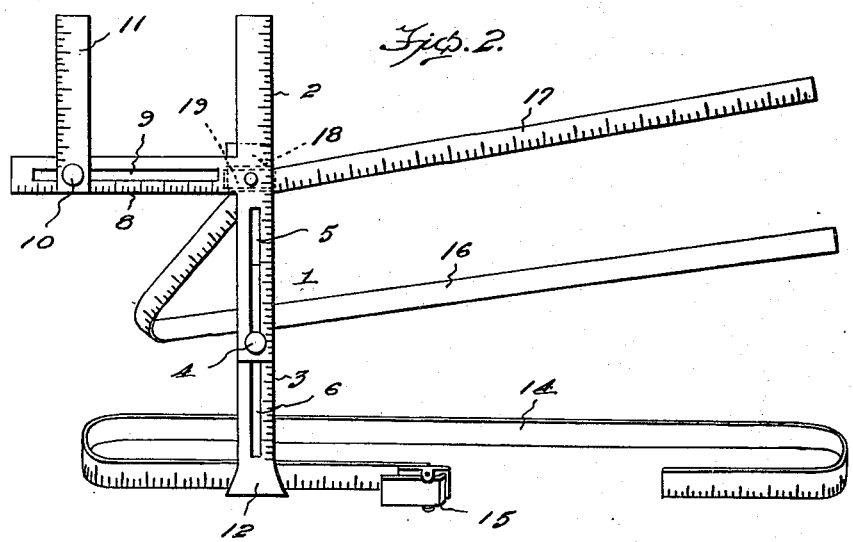

UNITED STATES PATENT OFFICE.

AKI MIYAMOTO, OF SAN FRANCISCO, CALIFORNIA.

TAILOR'S MEASURE.

1,201,217.  Specification of Letters Patent.  Patented Oct. 10, 1916.

Application filed May 18, 1915. Serial No. 28,886.

*To all whom it may concern:*

Be it known that I, AKI MIYAMOTO, a subject of the Emperor of Japan, residing at San Francisco, in the county of San Francisco and State of California, have invented certain new and useful Improvements in Tailors' Measures; and I do hereby declare the following to be a full, clear, and exact description of the invention, such as will enable others skilled in the art to which it appertains to make and use the same.

The invention relates to improvements in tailors' measures.

The object of the present invention is to improve the construction of tailors' measures and to provide a simple, inexpensive and efficient tailor's measure designed principally for the use of tailors in taking measurements for ladies' garments and adapted to be secured to the person being measured by the measuring means whereby the device will be retained in position and accurate measurements afforded without liability of the device or any portion thereof accidentally slipping out of position and causing a false measurement.

A further object of the invention is to provide a tailor's measure of this character adapted to indicate the centers of the back and both right and left sides of the skirt according to the measurements thereof and also the waist, bust and shoulder measure without having to guess the various points of measurement required in making a garment.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawing Figure 1 is a perspective view of a tailor's measure constructed in accordance with this invention, and shown applied to a person, Fig. 2 is an elevation of the same detached, Fig. 3 is a detail elevation showing the standard in side view.

Like numerals of reference designate corresponding parts in the several figures of the drawing.

In the accompanying drawing in which is illustrated the preferred embodiment of the invention, the tailor's measure comprises in its construction a standard 1 composed of upper and lower graduated bars or sections 2 and 3 adjustably secured together by a set screw 4 or other suitable fastening device operating in vertical slots 5 and 6 of the upper and lower bars or sections and preferably provided with a nut 7 for clamping the upper and lower sections in their adjustment.

The upper and lower sections are constructed of brass or suitable material and the upper section is provided at a point intermediate of its ends with a rearwardly extending approximately horizontal arm 8 adapted to be arranged beneath the arm pit and having a longitudinal slot 9 for the reception of a fastening device 10 which secures a vertical bar 11 to the arm in spaced relation with the upper portion of the upper section. The horizontal arm 9 and the vertical bar 11 are also provided with graduations and the bar 11 is adjustable along the arm 8 toward and from the upper bar or section 2. The lower section or bar 3 is provided with an enlarged portion or foot 12 having a slot 13 through which passes a waist measuring tape 14 adapted to be passed around the waist of a person and provided at one end with a clasp 15 for engaging the free end or portion of the measuring tape 14 to secure the same in position around the waist of the person, to assist in holding the device in position. The tailor's measure is also provided at the juncture of the horizontal arm and the upper bar or standard 2 with measuring tapes 16 and 17 adapted to extend around the bust and over the shoulders and secured in their adjustment by clasps 18 and 19 mounted on the standard and arranged to engage the measuring tapes 16 and 17 at the free portions thereof. The measuring tapes 14, 16 and 17 are provided with graduations and when secured in position around the waist, bust and shoulders of a person they maintain the tailor's measure in proper position and enable accurate measurements to be obtained without liability of the parts slipping and causing false measurements.

The waist measuring tape takes the measure of the waist and the upper and lower sections of the standard are then adjusted to arrange the arm 8 of the device under the arm pit. The vertical bar then is adjusted to the back of the shoulders and the bust measuring tape is passed around the bust and fastened by the clasp 18. This affords the bust measure. The shoulder is then measured by the measuring tape 17. The graduations of the waist measuring tape will indicate the centers of the back and the right and left sides of the skirt and the various points on a garment may be accurately obtained without guessing.

What is claimed is:—

In a tailor's measure, a standard composed of relatively adjustable graduated upper and lower sections, an enlarged base formed upon the lower section and provided with a slot, a waist measuring tape having a portion thereof inserted in said slot, a horizontal arm formed upon and extending transversely from said upper section intermediate of its ends, a vertical bar adjustably carried by said arm and being of equal length and parallel to the portion of said upper section extending above said horizontal arm for coaction with said portion for measuring armpits, a shoulder measuring tape attached to said upper section at the junction of said horizontal arm and the upper section, and a bust measuring tape attached to said upper section at the junction of said horizontal arm and said upper section and clasps carried by said upper section for engaging the free end of said shoulder and bust measuring tape.

In testimony whereof I affix my signature in presence of two witnesses.

AKI MIYAMOTO.

Witnesses:
JOHN H. SEARS,
OLGA D. SIEVERT.

Copies of this patent may be obtained for five cents each, by addressing the "Commissioner of Patents, Washington, D. C."